United States Patent
Glassner

(10) Patent No.: US 7,588,512 B2
(45) Date of Patent: Sep. 15, 2009

(54) DRIVE AXLE FOR A LIGHT VEHICLE

(75) Inventor: Rudolf Glassner, Kottes (AT)

(73) Assignee: Engineering Center Steyr GmbH & Co. KG, St. Valentin (AT)

( * ) Notice: Subject to any disclaimer, the term of this patent is extended or adjusted under 35 U.S.C. 154(b) by 267 days.

(21) Appl. No.: 11/527,243

(22) Filed: Sep. 26, 2006

(65) Prior Publication Data

US 2007/0072729 A1    Mar. 29, 2007

(30) Foreign Application Priority Data

Sep. 27, 2005    (AT)  .............................. GM 650/2005

(51) Int. Cl.
*F16H 48/06*    (2006.01)
(52) U.S. Cl. ..................................... 475/230
(58) Field of Classification Search ......... 475/210–213, 475/218, 220, 230, 248; 180/375–380; 74/607, 74/325, 331; 301/128; 295/38, 39
See application file for complete search history.

(56) References Cited

U.S. PATENT DOCUMENTS

| 741,931 | A | * | 10/1903 | Sandell | ........................ 475/244 |
| 805,740 | A | | 11/1905 | Lowe | |
| 1,822,623 | A | * | 9/1931 | Hill | ............................. 180/380 |
| 3,365,984 | A | | 1/1968 | Musgrave | |
| 4,064,974 | A | | 12/1977 | Filderman | |
| 4,729,455 | A | * | 3/1988 | May | .............................. 188/58 |
| 5,286,239 | A | * | 2/1994 | Ito et al. | ....................... 475/231 |
| 5,980,416 | A | * | 11/1999 | Gafvert | ........................ 475/230 |
| 6,210,299 | B1 | | 4/2001 | Yoshioka | |
| 6,293,890 | B1 | * | 9/2001 | Kaku | ........................... 475/230 |
| 6,390,227 | B1 | * | 5/2002 | Abend et al. | ................. 180/375 |
| 6,616,565 | B1 | * | 9/2003 | Chen et al. | .................... 475/230 |
| 6,725,980 | B2 | | 4/2004 | Larkin | |
| 7,077,778 | B1 | * | 7/2006 | Irikura | ........................ 475/230 |

FOREIGN PATENT DOCUMENTS

| CH | 94132 | 4/1922 |
| GB | 9249 | 7/1913 |
| GB | 19850 | 11/1913 |
| WO | 91/17373 | 11/1991 |

* cited by examiner

*Primary Examiner*—Sherry L Estremsky
*Assistant Examiner*—Erin D Bishop
(74) *Attorney, Agent, or Firm*—Harness, Dickey & Pierce, P.L.C.

(57) ABSTRACT

A drive axle for a light vehicle having a chain drive and a differential is provided, wherein the axle pinion gears (11, 12) are connected to their half-axles (6, 7) in one piece and to the vehicle via fixed bearings (8, 8'). One of the half-axles (6) is made as a tube which receives an inner shaft (13) in a journaled manner which is fixedly plugged in the other half-axle (7). The differential cage (22, 22') is partly spherical and surrounds the balance pinion gears (20) and is fixedly connected to a chain sprocket (25). The differential cage comprises two symmetrical shells (22, 22') between which the chain sprocket (25) is directly fastened to the balance pins.

20 Claims, 3 Drawing Sheets

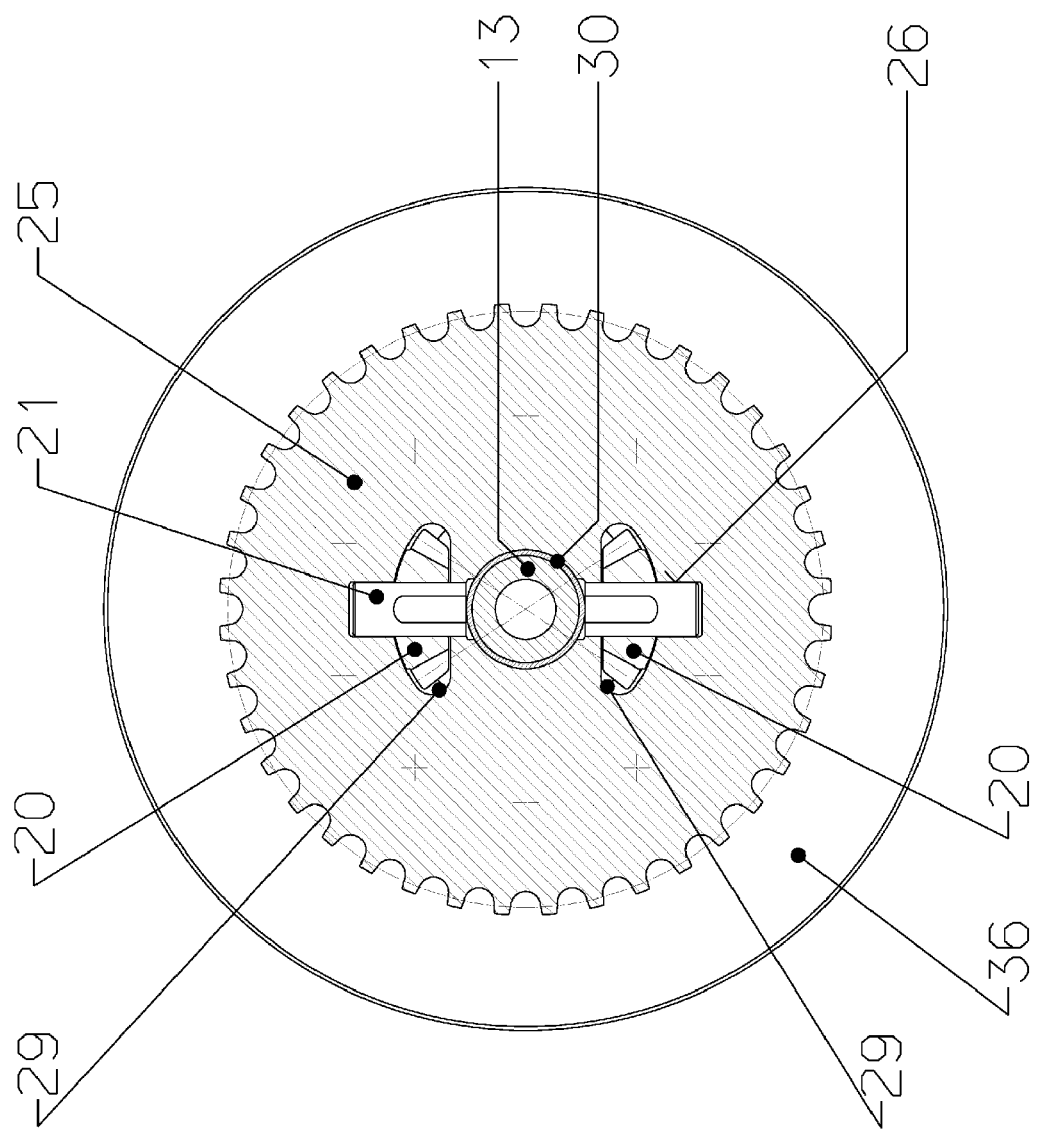

DRIVE AXLE FOR A LIGHT VEHICLE

CROSS-REFERENCE TO RELATED APPLICATIONS

This application claims the benefit of Austrian Utility Model No. GM 2005/0650, which was filed on Sep. 27, 2005, and the disclosure of which is incorporated herein by reference.

FIELD

The present disclosure relates to a drive axle for a light vehicle having a chain drive and a differential which comprises a differential cage, balance pinion gears and two axle pinion gears. The light vehicle can be a two-track microcar, a go-kart or a so-called "quad" which the driver sits on as on a motorcycle and steers the wheels of the front axle by means of handlebars likewise based on a motorcycle. Vehicles of this type have, in their simplest form, a throughgoing drive axle without a differential; the two wheels are therefore rigidly connected to one another, with the drive axle being supported centrally in the vehicle or in a central axle beam. With this construction, the introduction of a differential is difficult because it separates the rear axle into two halves which would jack-knife against one another.

BACKGROUND

A drive axle of this type is known from U.S. Pat. No. 6,210,299. It consists there of two half-axles made as a tube and inserted in a central tube, with the central tube bearing a ring gear and being supported in a differential case fixedly connected to the vehicle or to a central beam. An input shaft meshing with the ring gear is supported in the differential case. The tube contains two balance gears of a differential, the half-axles are made as output pinion gears at their proximal ends and are clamped together by a threaded pin for their axial fixing. The support of the half-axles in the differential case impairs the driving properties and generates substantial transverse forces between the central tube and the half-axles which a bearing of the half-axles in the central tube would have to absorb, how is not set forth.

SUMMARY

It is therefore the object of the invention to provide a drive axle with a differential which ensures good driving properties and is nevertheless light and cheap. This is achieved in accordance with the invention by the features of the independent claim.

An axle beam is usually provided for the connection of the drive axle in accordance with the invention to the vehicle. The two half-shafts are rotatable with respect to one another via the inner shaft, but are connected to one another in a very flexurally resistant manner. Because both half-axles are supported in fixed bearings and are thus fixed in the axial direction, no thrust bearing is required for the inner shaft (it would also be difficult to accommodate there) and the differential cage does not have to take part in the axle guiding in any way. The differential cage thus actually only serves as a "spacer" for the balance pinion gears and as a connection member between the chain sprocket and the axles of the balance pinion gears. It is also centered via the bearing bushing of the chain sprocket bearing so that it does not require any bearings at all itself. A technically problem-free solution is thus achieved with very low production and assembly costs overall.

A preferred embodiment consists of the fact that the differential cage comprises two shells symmetrical with respect to the plane of the balance pins, of the chain sprocket lying in the plane of the balance pins and of being connected to a shell at both sides. The shells themselves are thus not subject to any strain because the drive torque is transmitted from the chain sprocket to the balance pins over the shortest path. The shells can thus be made from sheet metal as simple drawn parts, with their symmetry making them identical parts. For this purpose, the shells have extensions at their sides facing one another for the reception of the balance pins and a flange lying in an axially normal plane for the connection to the chain sprocket.

It is particularly advantageous to provide the chain sprocket with windows and cut-outs receiving the balance pinion gears and engaging into the balance pins and centering the chain sprocket on the inner shaft. The drive torque is thus transmitted directly from the chain sprocket to the balance pin.

Even if the differential cage does not need any bearing of its own, the shells nevertheless have seats on their sides remote from one another for a seal which seals the differential cage with respect to the half-axles. Dirt is thus kept away from the pinion gears and the discharge of lubricant is prevented.

An advantageous detail comprises at least one ring surrounding the inner shaft being provided between the axle pinion gears. The ring or the rings serve as washer disks or spacers for the setting of the tooth clearance or of a minimal tooth clearance.

In the preferred embodiment, the inner shaft is supported in the half-axle made as a tube at its inner end and is supported at some distance from this in plain bearings.

Finally, it is still within the framework of the invention to fixedly attach a brake disk to the half-axles in proximity to the axle pinion gears. They thus lie at a favorably low spacing from the bearings of the half-axles and from one another. The latter permits the use of a disk brake with a double caliper which acts simultaneously on both disks in a particularly simple manner.

Further areas of applicability of the present disclosure will become apparent from the detailed description provided hereinafter. It should be understood that the detailed description and specific examples, while indicating the preferred embodiment of the present disclosure, are intended for purposes of illustration only and are not intended to limit the scope of the present disclosure.

BRIEF DESCRIPTION OF THE DRAWINGS

The invention will be described and explained in the following with reference to Figures. There are shown:

FIG. 3: a section in accordance with III-III.

DETAILED DESCRIPTION

The following description of the preferred embodiment is merely exemplary in nature and is in no way intended to limit the present disclosure, its application, or uses.

Figure 1:
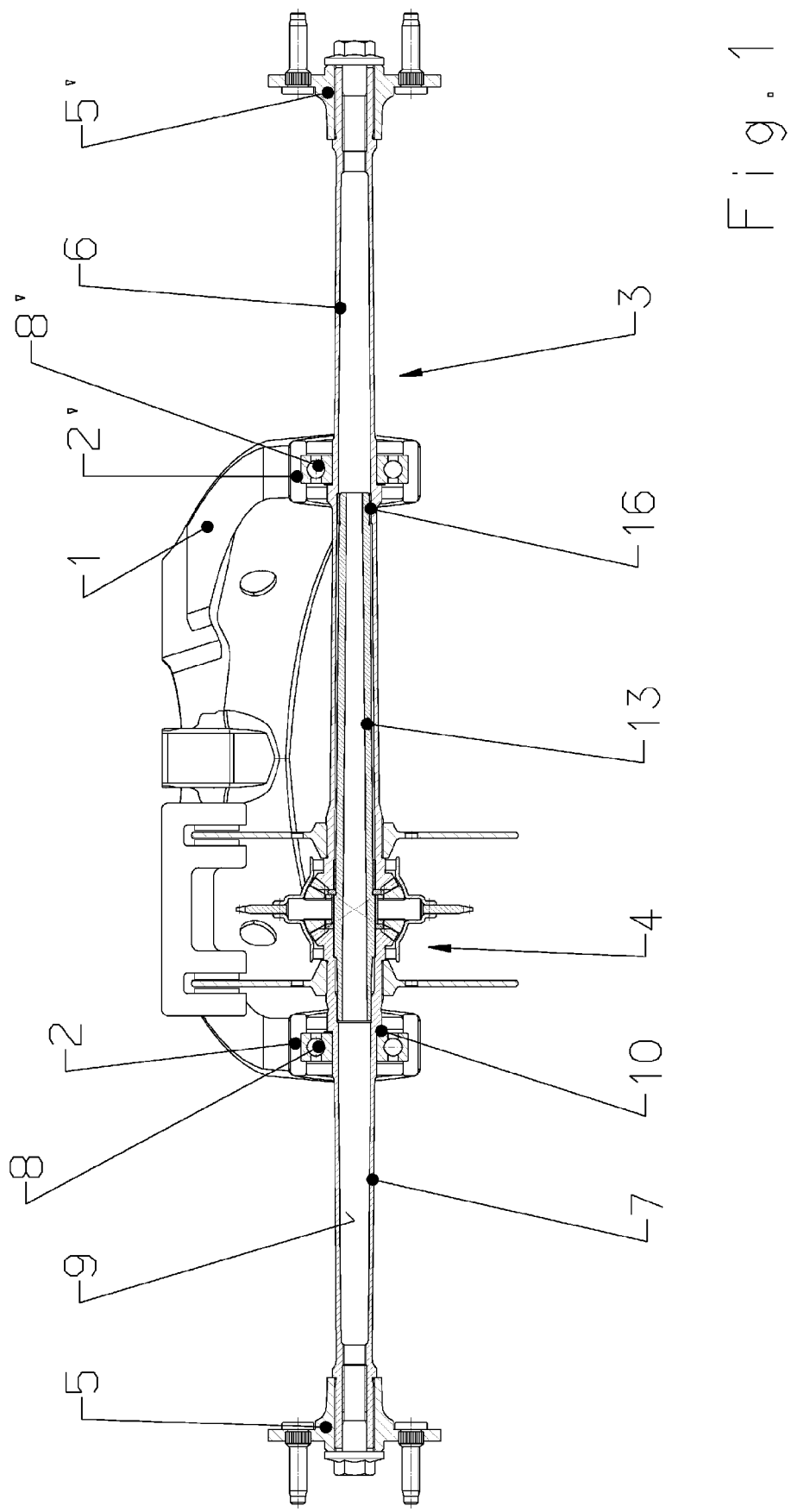
FIG. 1: a longitudinal section of the axle in accordance with the invention.

In FIG. 1, only the axle beam 1 with its bosses 2, 2' at both sides for the reception of a rear axle 3 in accordance with the invention can be seen. It has a differential 4 between the bosses 2, 2' and wheel flanges 5, 5' at its outer ends. The wheel flanges 5, 5' are fastened to the outer ends of the half-axles 6, 7 projecting far beyond the bosses 2, 2'. The half-axle 6 at the right in the Figure is made as a tube; the left hand half-axle 7 can likewise be made as a tube, but does not have to be. The half-axles 6, 7 are each supported in an axle bearing 8, 8' partly surrounded by the bosses 2, 2' in the axle beam 1. Their axis of rotation is designated by 9.

Figure 2:
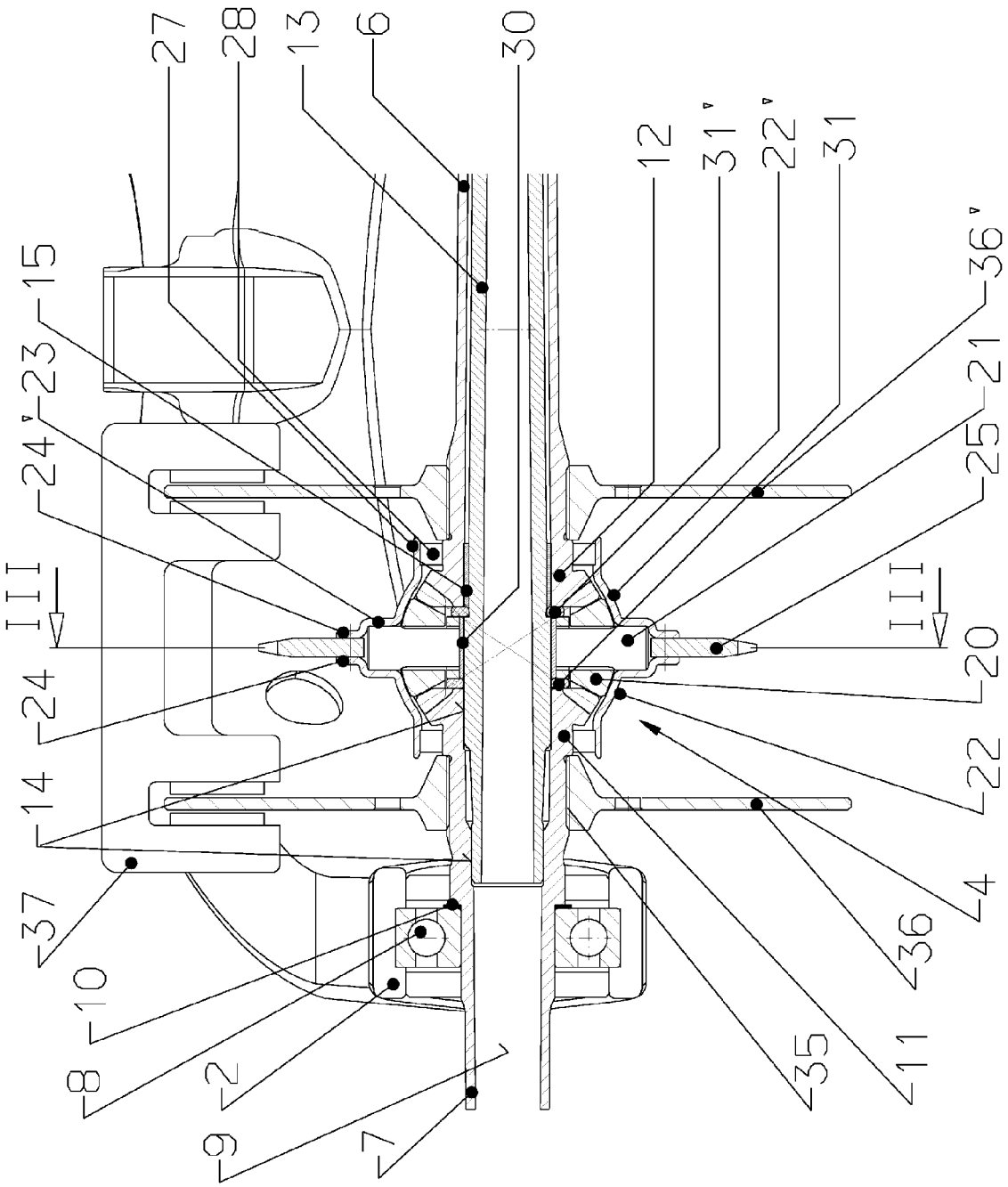
FIG. 2: its central part, enlarged.

It can be recognized in FIG. 2 that the axle bearing is seated fixedly in the boss 2 in the axial direction and that the left hand half-axle 7 has a shoulder 10 which is likewise supported at the axial bearing 8. Spacer rings, not shown, can optionally be inserted. The axial bearing 8 is thus a fixed bearing, at least with respect to outward displacement. The right hand axial bearing 8' (FIG. 1) is made in a mirror-inverted fashion and is thus likewise a fixed bearing. Both half-axles 6, 7 are combined at their inner ends in each case with an axle pinion gear 11 (left), 12 (right), or are, as shown, in one piece. To ensure the bending stiffness of the total axle, the two half-axles 6, 7 are connected to one another in a manner stiff against bending by means of an inner shaft 13. The inner shaft 13 is here likewise made as a tube and is pressed into the left hand half-axle 7 that is fixedly connected to it, at two points 14. The inner shaft 13 could also be in one piece with the left hand half-axle 7. It thus turns with the left hand half axle 7 and projects far outwardly into the right hand tubular half-axle 6. It is rotatably journaled therein in two plain bearings 15, 16 disposed far apart from one another. The plain bearing 15 is formed at the inner end of the right hand half-axle; the second plain bearing 16 is close to the axial bearing 8' (see FIG. 1). The two half-axles 6, 7 thus form a stiff unit, albeit relatively rotatable to one another.

The differential 4 furthermore consists of balance pinion gears 20 journaled on balance pins 21 and of a differential cage composed of two shells 22, 22'. The two shells 22, 22' are identical, they surround the balance pinion gears 20 with a spherically shaped part which merges at its sides facing one another via an extension 23 into flanges 24, 24'. The extension 23 can surround the balance pins 21 or extend around it in an uninterrupted manner. A chain sprocket 25 is arranged between the flanges 24, 24' of the two shells 22, 22' and is fixedly connected to the shells at both sides, for example screwed or riveted.

It can be seen in FIG. 3 that the chain sprocket 25 is centered on the inner shaft 13 with interposition of a bushing 30, has windows 29 for the reception of the balance pinion wheels 20 and cut-outs 26 for the force transmitting connection to the balance pins 21. In this manner, the drive force introduced via the chain sprocket 25 is transmitted directly to the balance pins 21 and the balance pinion gears are simultaneously outwardly supported. This is possible because the chain sprocket 25 lies in the plane of the axles of the balance pins 21.

It can furthermore again be seen in FIG. 2 that the shells 22, 22' form seats 27 for seals 28 which seal the interior of the differential cage with respect to the half-axles 6, 7. It follows from what has been said that the shells 22, 22' practically do not have to receive any forces. They can therefore be made as light pressed sheet metal parts. Washer disks 31, 31' made as spacer rings ensure a minimal tooth clearance between the pinion gears in cooperation with the bearing bushing 30.

Finally, the half-axles 6, 7 have cylindrical seating surfaces 35 for brake disks 36, 36' somewhat outside the seals 28. They can be actuated via a common brake caliper 37 fastened to the beam 1.

Since both axle bearings 8 are fixed bearings, they are particularly easy to dismantle and to assemble. As soon as the bearings 8 are separated from the bosses 2, 2' and the shells 22, 22' are separated from one another by releasing their fixed connection, the two half-axles 6, 7 can simply be pulled apart.

The description of the present disclosure is merely exemplary in nature and, thus, variations that do not depart from the gist of the present disclosure are intended to be within the scope of the present disclosure. Such variations are not to be regarded as a departure from the spirit and scope of the present disclosure.

What is claimed is:

1. A drive axle for a vehicle, comprising:
   first and second rotatable axle shafts each being supported for rotation by one of first and second spaced apart bearings adapted to be fixed to the vehicle, each bearing restricting axial movement of one of the first and second axle shafts;
   an inner shaft fixed for rotation with one of the first and second axle shafts and rotatably supported within a hollow portion of the other first and second axle shaft, the inner shaft extending substantially the entire distance between the bearings; and
   a differential assembly including axle pinion gears each being fixed for rotation with one of the first and second axle shafts, balance pinion gears rotatably supported on balance pins, a differential cage surrounding the balance pinion gears and outer ends of the balance pins, and a sprocket fixed to the cage.

2. The drive axle of claim 1, further including a pair of spaced apart inner bearings supporting the inner shaft within the other first and second axle shaft, one of the inner bearings being positioned proximate one of the bearings supporting the first and second axle shafts.

3. The drive axle of claim 2, wherein the other of the inner bearings is positioned proximate the axle pinion gear that is fixed for rotation with the other first and second axle shaft.

4. The drive axle of claim 1, wherein the differential cage comprises two shells symmetrical with respect to a plane containing axes of the balance pins, the sprocket being positioned in the plane and being connected to each shell.

5. The drive axle of claim 4, wherein the shells have extensions at their sides facing one another for the reception of the balance pins and flanges extending perpendicular to a cage axis of rotation for connection to the sprocket.

6. The drive axle of claim 1, wherein the sprocket has windows receiving the balance pinion gears and cut-outs receiving the balance pins.

7. The drive axle of claim 4, wherein the shells have seats at their sides remote from one another for a seal sealing the differential cage with respect to the first and second axle shafts.

8. The drive axle of claim 1, wherein at least one ring surrounds the inner shaft and is positioned between the axle pinion gears.

9. The drive axle of claim 1, further including a common brake caliper for restricting rotation of brake disks fastened to the first and second axle shafts.

10. A drive axle for a vehicle, comprising:
    first and second rotatable axle shafts each being supported for rotation by one of first and second spaced apart bearings adapted to be fixed to the vehicle;
    an inner shaft fixed for rotation with one of the first and second axle shafts and rotatably supported within a hollow portion of the other first and second axle shaft and extending substantially the entire distance between the bearings; and
    a differential assembly including axle pinion gears each being fixed for rotation with one of the first and second axle shafts, balance pinion gears rotatably supported on balance pins, and a differential cage including first and second shells, each balance pinion gear being supported in part by a spherically shaped seat of the first shell and a spherically shaped seat of the second shell, the differential assembly further including a sprocket fixed to the cage.

11. The drive axle of claim 10, wherein the sprocket is sandwiched between radially outwardly extending flanges formed on each of the first and second shells.

12. The drive axle of claim 10, wherein the first axle shaft includes a stepped cavity, the inner shaft being fixed to the first axle shaft at two axially spaced apart locations of different diameters.

13. The drive axle of claim 10, wherein each bearing restricts axial movement of one of the first and second axle shafts.

14. The drive axle of claim 10, wherein the sprocket has windows receiving the balance pinion gears and cut-outs receiving the balance pins and is centered on the inner shaft.

15. The drive axle of claim 10, wherein the shells have seats at their sides remote from one another for a seal sealing the differential cage with respect to the first and second axle shafts.

16. The drive axle of claim 10, wherein at least one ring surrounds the inner shaft and is positioned between the axle pinion gears.

17. The drive axle of claim 10, further including a common brake caliper for restricting rotation of brake disks fastened to the first and second axle shafts.

18. The drive axle of claim 10, wherein each balance pin is partly circumferentially surrounded by each of the first and second shells.

19. A drive axle for a vehicle, comprising:
first and second rotatable axle shafts each being supported for rotation by one of first and second spaced apart bearings adapted to be fixed to the vehicle, the first axle shaft having a stepped cavity;
an inner shaft fixed for rotation with the first axle shaft at two axially spaced apart locations of different diameters and rotatably supported within a hollow portion of the second axle shaft; and
a differential assembly including axle pinion gears each being fixed for rotation with one of the first and second axle shaft, balance pinion gears rotatably supported on balance pins, a differential cage including first and second shells, and a sprocket fixed to the cage, wherein each balance pinion gear is supported in part by a spherically shaped seat of the first shell and a spherically shaped seat of the second shell.

20. A drive axle for a vehicle, comprising:
first and second rotatable axle shafts each being supported for rotation by one of first and second space apart bearing adapted to be fixed to the vehicle;
an inner shaft fixed for rotation with one of the first and second axle shafts and rotatably supported within a hollow portion of the other first and second axle shaft; and
a differential assembly including axle pinion gears each being fixed for rotation with one of the first and second axle shafts, balance pinion gears rotatably supported on balance pins, a differential cage including first and second shells, and a sprocket fixed to the cage, wherein each balance pinion gear is supported in part by a spherically shaped seat of the first shell and a spherically shaped seat of the second shell, and wherein the inner shaft is rotatably supported within the other of the first and second axle shafts at a location aligned with one of the axle pinion gears and at another location proximate one of the bearings.

* * * * *